(12) United States Patent
Dell'erba et al.

(10) Patent No.: US 7,284,770 B2
(45) Date of Patent: Oct. 23, 2007

(54) THREAD PROTECTOR FOR TUBULAR MEMBERS

(75) Inventors: Diego Dell'erba, Campana (B) (AR); Gabriel E. Carcagno, Campana (B) (AR)

(73) Assignee: Tenaris Connections AG, Schaan (LI)

( * ) Notice: Subject to any disclaimer, the term of this patent is extended or adjusted under 35 U.S.C. 154(b) by 62 days.

(21) Appl. No.: 11/045,132

(22) Filed: Jan. 31, 2005

(65) Prior Publication Data

US 2005/0166986 A1    Aug. 4, 2005

Related U.S. Application Data

(60) Provisional application No. 60/540,551, filed on Feb. 2, 2004.

(51) Int. Cl.
*B65D 59/06*    (2006.01)

(52) U.S. Cl. .................. 285/45; 285/901; 138/96 T

(58) Field of Classification Search .............. 285/45, 285/46, 52, 333, 334, 901; 138/96 T
See application file for complete search history.

(56) References Cited

U.S. PATENT DOCUMENTS

| | | | | |
|---|---|---|---|---|
| 1,640,969 A | * | 8/1927 | Westerman | 138/96 T |
| 1,776,528 A | * | 9/1930 | Unke | 138/96 T |
| 2,195,530 A | * | 4/1940 | Curtis | 138/96 T |
| 2,204,130 A | * | 6/1940 | Engstrom | 138/96 T |
| 2,930,409 A | * | 3/1960 | Higgins | 138/96 T |
| 3,485,271 A | * | 12/1969 | Halsey | 138/96 T |
| 4,020,873 A | * | 5/1977 | Palarino | 138/96 T |
| 4,210,179 A | * | 7/1980 | Galer | 138/96 T |
| 4,549,337 A | * | 10/1985 | Newell et al. | 29/527.4 |
| 4,582,090 A | | 4/1986 | Chase et al. | 138/96 T |
| 4,616,679 A | | 10/1986 | Benton | |
| 4,655,256 A | * | 4/1987 | Lasota et al. | 138/96 T |
| 4,757,595 A | * | 7/1988 | Fraering, Jr. | 29/447 |
| 4,796,668 A | * | 1/1989 | Depret | 138/96 T |
| 4,809,752 A | * | 3/1989 | Strodter | 138/96 T |
| 4,957,141 A | | 9/1990 | Dreyfuss et al. | 138/89 |
| 5,195,562 A | | 3/1993 | Dreyfuss et al. | 138/96 |
| 5,244,015 A | * | 9/1993 | Dreyfuss et al. | 138/96 T |
| 5,303,743 A | | 4/1994 | Vincent | 138/96 |

(Continued)

FOREIGN PATENT DOCUMENTS

AR    241313    5/1992

(Continued)

*Primary Examiner*—David Bochna
(74) *Attorney, Agent, or Firm*—Fitzpatrick, Cella, Harper & Scinto

(57) ABSTRACT

A pipe thread protector includes a case, a first seal member, and a second seal member. The case is attachable to an end of a pipe to protect a threaded region of the pipe. The case has a cylindrical or frustoconical portion having threads over at least a portion of its length to engage the threaded region of the pipe, and an annular end portion configured to abut a distal end of the pipe. A first seal member is disposed at the cylindrical portion of the case, and a second seal member is disposed at the annular end portion of the case. At least one of the first and second seal members (i) is detachable from the case, and (ii) comprises a material different than a material of the case.

13 Claims, 6 Drawing Sheets

U.S. PATENT DOCUMENTS

| | | | |
|---|---|---|---|
| 5,352,383 A | 10/1994 | Johnson et al. | 252/389.62 |
| 5,452,749 A * | 9/1995 | Johnson et al. | 138/96 T |
| 5,997,049 A * | 12/1999 | Kingsford et al. | 285/331 |
| 6,196,270 B1 | 3/2001 | Richards et al. | 138/96 |
| 6,367,508 B1 * | 4/2002 | Richards et al. | 138/96 T |
| 6,564,875 B1 | 5/2003 | Bullock | 166/382 |
| 2005/0045240 A1 | 3/2005 | Casteran | 138/96 |

FOREIGN PATENT DOCUMENTS

| | | |
|---|---|---|
| DE | 3229531 A1 | 2/1984 |
| GB | 2093426 A | 9/1982 |
| WO | WO 95/00679 | 1/1995 |

\* cited by examiner

MATERIAL: POLYURETHANE
HARDNESS: 90

MATERIAL: POLYURETHANE
HARDNESS: 70

MATERIAL: NBR
HARDNESS: 90

MATERIAL: NBR
HARDNESS: 70

MATERIAL: POLYURETHANE
HARDNESS: 90

MATERIAL: NBR
HARDNESS: 90

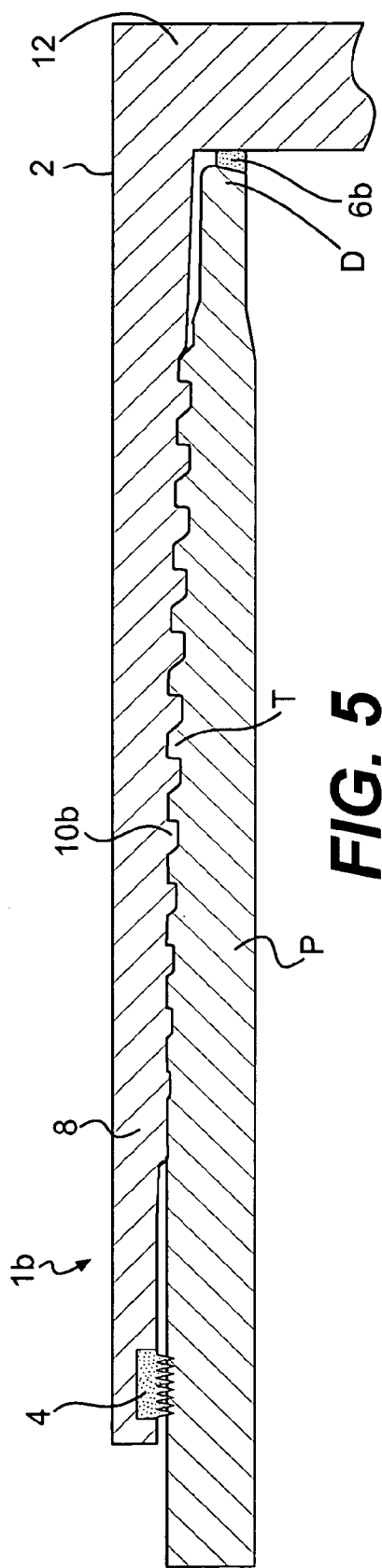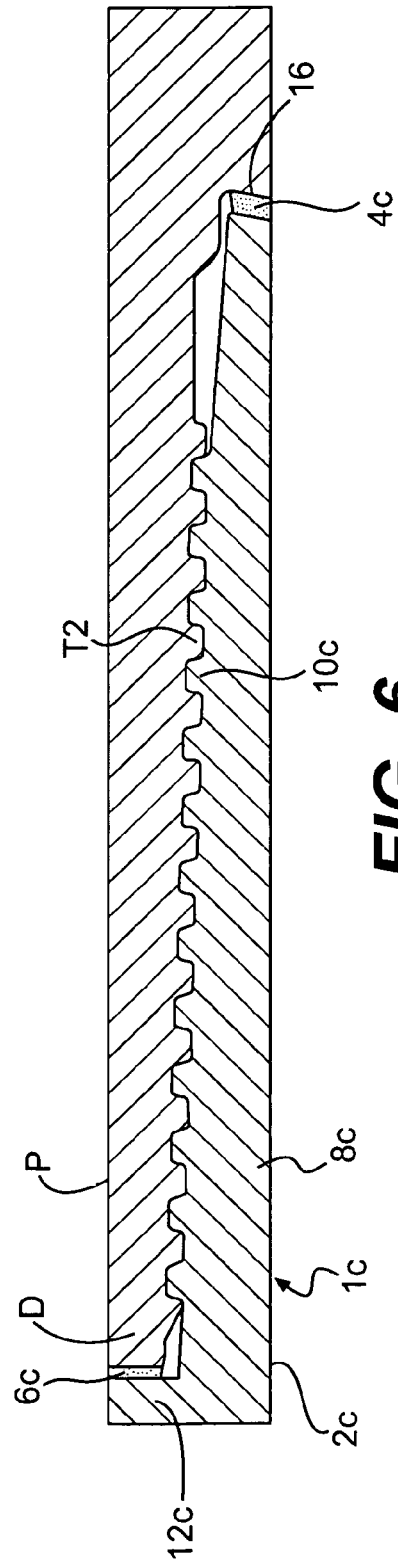

THREAD PROTECTOR FOR TUBULAR MEMBERS

FIELD OF THE INVENTION

Our invention relates to a device attachable to an end of a pipe to protect the pipe end from damage due to impact with other objects during transit and due to exposure to corrosive substances. In particular, our invention relates to such a protector for dope-free connections, i.e., connections that, due to a coating of dry lubricant, can be assembled without applying any grease or dope.

BACKGROUND OF THE INVENTION

Devices are known for protecting threaded connections of pipes. As used herein the term "pipe" should be construed broadly to encompass any tubular members, including, but not limited to, pipes, tubes, connectors, conduits, fittings, and the like.

One technique that has been used to protect threaded connections of pipes from dust and corrosive fluids is to wrap the pipe ends with plastic film.

Various other thread protectors have also been developed. These conventional protectors typically employ a plastic protector to prevent mechanical damage of the threaded areas, while corrosion is prevented by applying a storage compound or grease. Several different approaches have been used for dealing with corrosion. For example, U.S. Pat. No. 5,352,383 discloses using a liquid corrosion inhibitor applied to the pipes. U.S. Pat. No. 5,452,749 discloses using an external sealing device to keep out contaminants, but it does not includes an internal sealing device.

U.S. Pat. Nos. 4,582,090 and 4,796,668 disclose thread protectors using internal and external sealing devices. The internal and external sealing devices disclosed in both of these patents are formed integrally with the body of the thread protector. Accordingly, the sealing devices are made of the same material as the body of the thread protector. With this arrangement, the material of the sealing members is limited by the strength requirements of the body of the thread protector. The relatively stiff materials required to provide rigidity to the body of the thread protector disclosed in the '668 patent cannot adequately seal against the pipes. Adequate flexibility of the sealing members is required to ensure proper sealing. The '090 patent attempts to remedy this problem by providing a metallic shell outside the body of the protector to provide rigidity to the thread protector. The additional shell of the thread protector disclosed in the '090 patent increases the cost and complexity of the thread protector. Also, since the body of the thread protector of the '090 patent is made of the same relatively soft material as the seal members, the threaded interface between the protector and the pipe cannot be made as strong as if the body were made of a harder material.

SUMMARY OF THE INVENTION

Our invention remedies these and other deficiencies in the prior art and provides a thread protector that effectively protects pipe threads from corrosive environments and dust. The invention has been found to be particularly well suited to protect dope-free threaded pipes. Dope-free pipes have a special dry coating deposited over the threaded areas that allows the pipe to be immediately used in the field without the need for lubricant such as grease. Additionally, the protector of our invention seals against contaminants, thereby eliminating the need to clean the pipe connections on site. This is especially useful for automatic rigs at offshore locations where personnel and space for cleaning operations is limited. With this invention, no storage grease need be applied for corrosion protection purposes and the coating remains dry, clean, and ready for immediate use.

According to one aspect our invention relates to a pipe thread protector comprising a case, a first seal member, and a second seal member. The case is attachable to an end of a pipe to protect a threaded region of the pipe. The case has a cylindrical or frustoconical portion having threads over at least a portion of its length to engage the threaded region of the pipe, and an annular end portion configured to abut a distal end of the pipe. A first seal member is disposed at the cylindrical portion of the case, and a second seal member is disposed at the annular end portion of the case. At least one of the first and second seal members (i) is detachable from the case, and (ii) comprises a material different than a material of the case.

According to a preferred aspect of our invention, both the first and second seal members are detachable from the case.

According to another preferred aspect of our invention, both the first and second seal members comprise a material different than a material of the case.

According to yet another preferred aspect of our invention, both the first and second seal members are comprised of elastomeric material.

A better understanding of these and other features and advantages of the invention may be had by reference to the drawings and to the accompanying description, in which preferred embodiments of the invention are illustrated and described.

BRIEF DESCRIPTION OF THE DRAWINGS

FIG. 5 is a partial cross-sectional view of a thread protector according to another preferred embodiment of our invention.

FIG. 6 is a partial cross-sectional view of a thread protector according to another preferred embodiment of our invention.

Throughout the figures, like or corresponding reference numerals have been used for like or corresponding parts.

DESCRIPTION OF THE PREFERRED EMBODIMENTS

Figure 1:
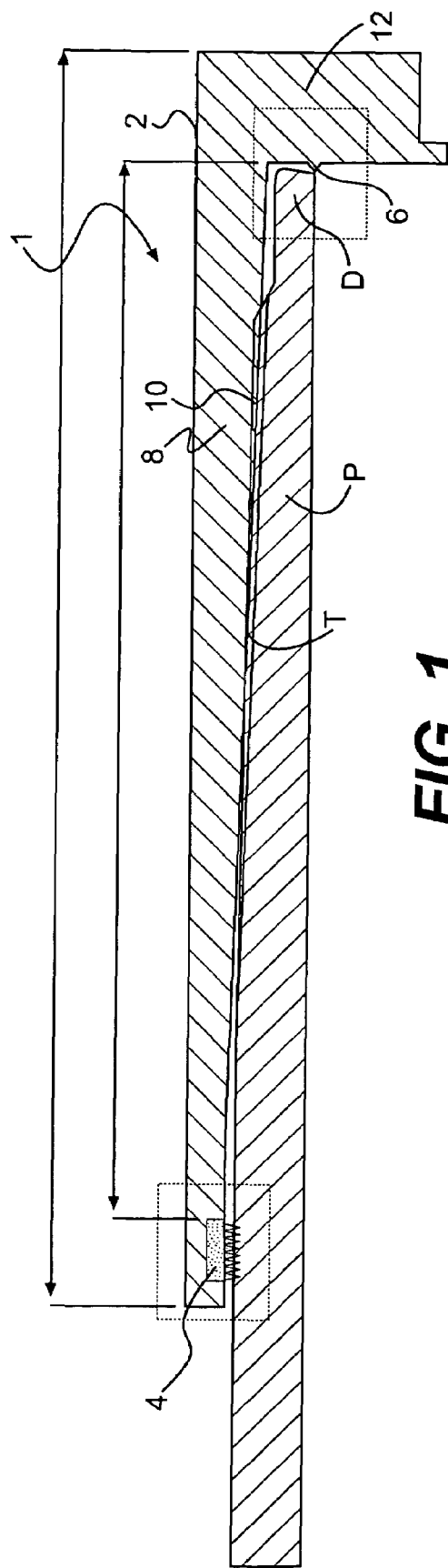
FIG. 1 is a partial cross-sectional view of a thread protector according to one preferred embodiment of our invention.

A thread protector according to one preferred embodiment of our invention is illustrated generally in FIG. 1.

The thread protector 1 comprises a case 2 attachable to an end of a pipe P to protect a threaded region T of the pipe P, and a pair of first and second seal members 4, 6, which cooperate to prevent the entrance of contaminants, such as dust and corrosive substances, to the threaded region T of the pipe P. At least one of the first and second seal members (i) is detachable from the case, and (ii) comprises a material different than a material of the case. Preferably, however, both the first and second seal members are detachable from the case and are made of a material different than the case. Further, at least one, but preferably both, of the first and second seal members are made of an elastomeric material.

As shown in FIG. 1, the case 2 comprises a cylindrical or frustoconical portion 8 having threads 10 over at least a portion of its length to engage the threaded region T of the pipe, and an annular end portion 12 configured to abut a distal end D of the pipe P. The case 2 provides mechanical protection to the end of the pipe P. The threaded portion 10 of the case 2 engages the threaded region T of the pipe P for installation and retention of the case 2 on the end of the pipe P. The annular end portion 12 of the case 2 abuts the distal end D of the pipe P and limits the distance the case 2 can be pressed onto the pipe P. Preferably, the case 2 is unitary and is formed of a semi-rigid plastic or polymeric material that provides sufficient strength to hold the protector 1 in place on the pipe P during use, and to protect the end of the pipe P. Examples of preferred materials for the case include, polyurethane, high-density polyethylene (HDPE), polyvinyl chloride (PVC), acrylonitrile-butadiene-styrene (ABS), polyethylene terephthalate (PET). However, the case 2 can advantageously be made of any material that is sufficiently rigid and durable to protect and seal the pipe ends. Also, the case can be constructed of multiple different components and/or materials.

The first seal member 4 (or distal seal member) is disposed at the cylindrical portion of the case 2 for sealing against a cylindrical surface of the pipe P. Preferably, the first seal member 4 comprises an elastomeric, substantially cylindrical band positioned in a radial groove 80 formed in the cylindrical portion 8 of the case 2. A plurality of elastomeric ribs 40 protrudes from the cylindrical band. Each of the ribs 40 constitutes a separate sealing surface for engagement with the cylindrical surface of the pipe P, thereby providing a redundant seal against passage of contaminants.

Figure 2:
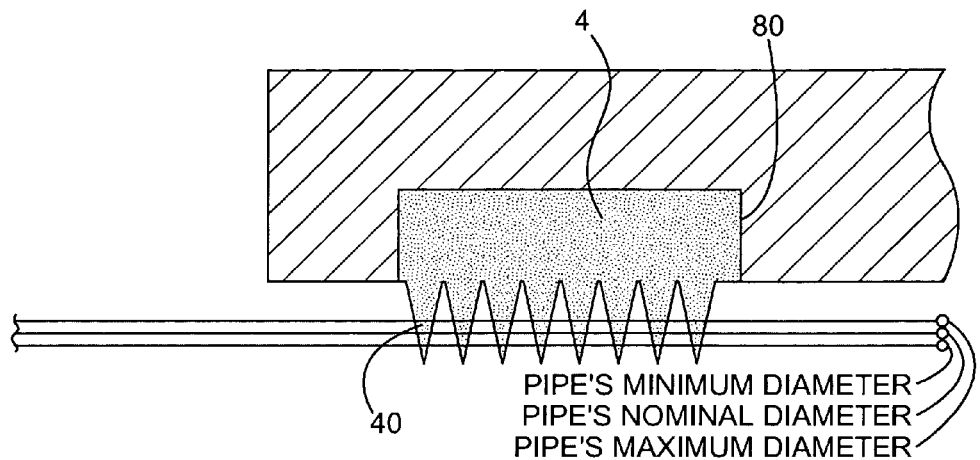
FIG. 2 is an enlarged detail view of the first seal member of the thread protector of FIG. 1.

As shown in FIG. 2, the pipe surface may be irregular due to manufacturing variances or physical damage to the pipe, and the pipe may expand and contract with changes in temperature. Thus, while the pipe has a nominal diameter, the pipe diameter may actually fluctuate between some maximum and some minimum diameter. The elastomeric nature of ribs 40 allows the seal member 4 to flex and effectively seal against even an irregular pipe surface. The flexibility of the ribs 40 also allows the seal 4 to accommodate expansion and contraction of the pipe P between the maximum and minimum diameters, respectively, while maintaining an effective seal.

The ribs 40 of the first seal member 4 are shown in FIG. 1 as having a substantially triangular cross section. Alternatively, the seal member may be constructed with ribs having any cross section that can effectively provide multiple sealing surfaces, including, but not limited to, a substantially trapezoidal cross section, a substantially dome-shaped cross section, a substantially circular cross section, and a substantially rectangular cross section. Some representative cross sections for the first seal member 4 are shown in FIGS. 4A-4I, along with the preferred Shore A hardness values of some preferred seal materials. The cross section should, however, be flexible enough to fit over the threaded region T of the pipe P without scratching or otherwise damaging the dopeless coating on the treaded region T of the pipe P during installation or removal of the protector 1. It is desirable, though not critical, that the seal members be selected to be resistant to mineral oils, vegetable oils, and various acids to which the pipes may be exposed, while keeping good elongation properties, adequate resilience, and tensile and compression set.

The shape, size, material, and hardness of the ribs may be varied depending on the design considerations attendant to a particular application, such as the characteristics of the pipe (e.g., size, material, surface finish, etc.), anticipated environment (e.g., humidity, type of contaminants, temperature, etc.), desired resistance to chemicals, criticality of sealing, etc.

Figure 3A:
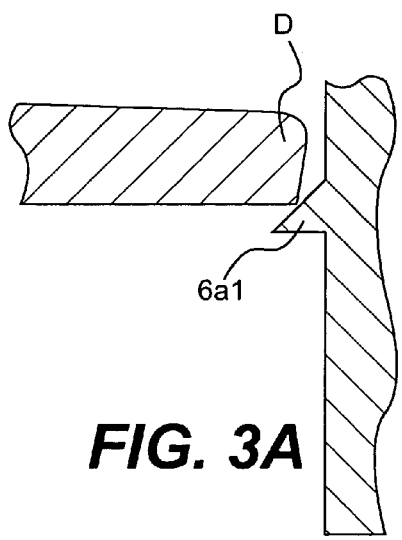
FIG. 3A is an enlarged detail view of the second seal member of the thread protector of FIG. 1.
Figure 3B:
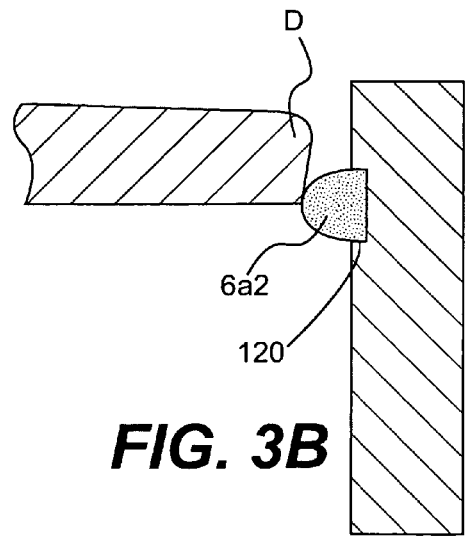
FIG. 3B is an enlarged detail view of a variation of the second seal member of the thread protector of FIG. 1.
Figure 4A:
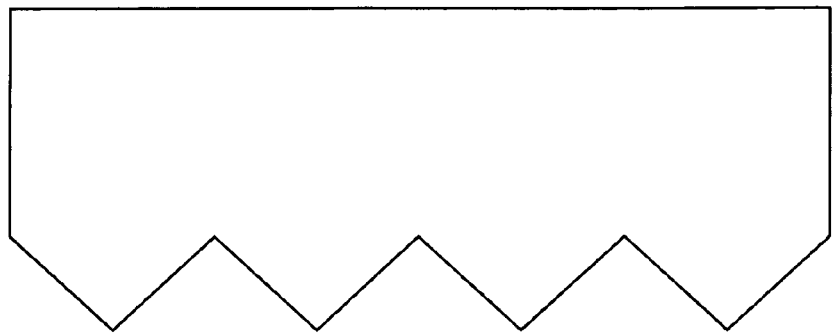
FIGS. 4A-4I are enlarged section views of different configurations of the first seal member of FIG. 1.
Figure 4B:
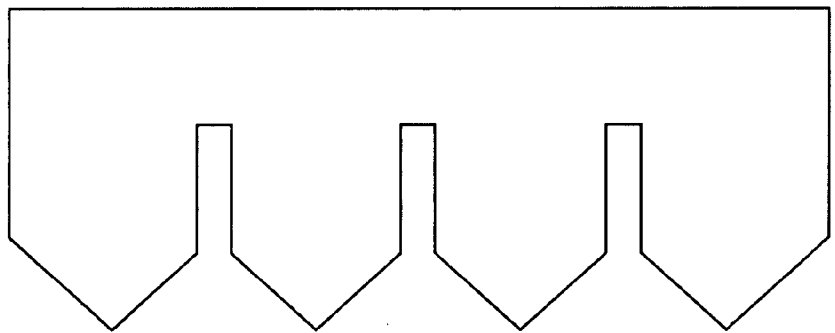
Figure 4C:
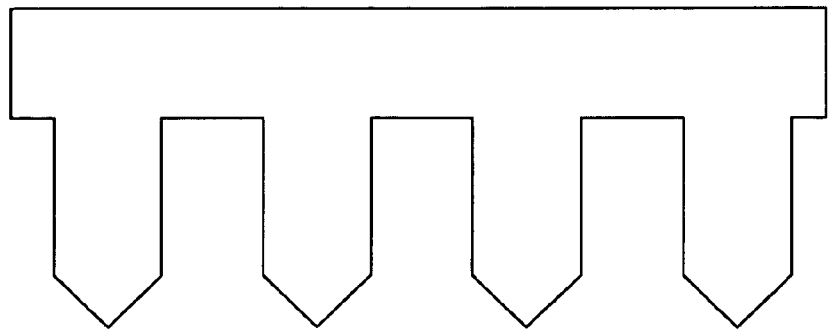
Figure 4D:
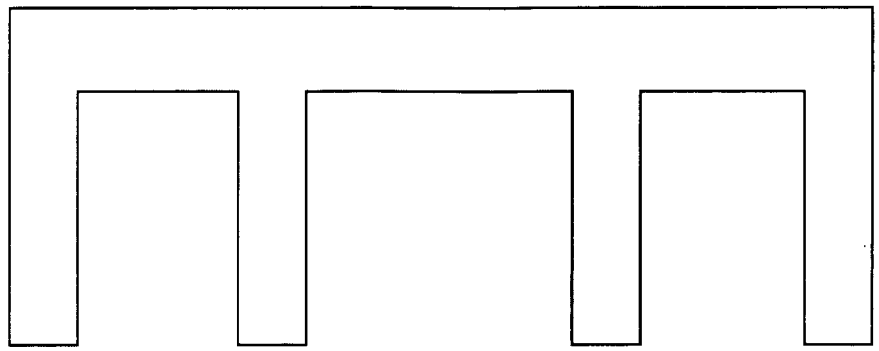
Figure 4E:
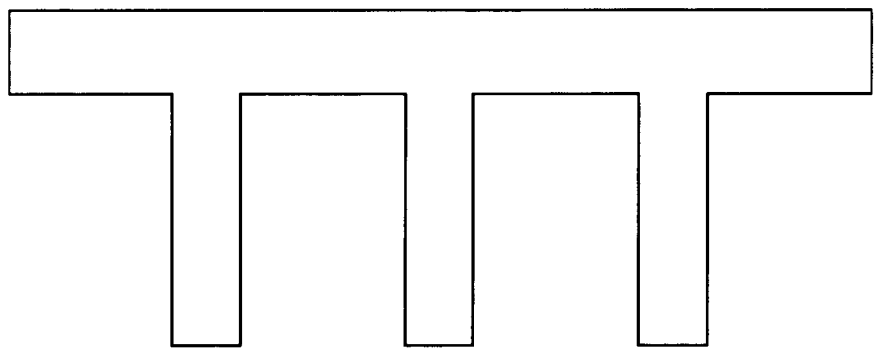
Figure 4F:
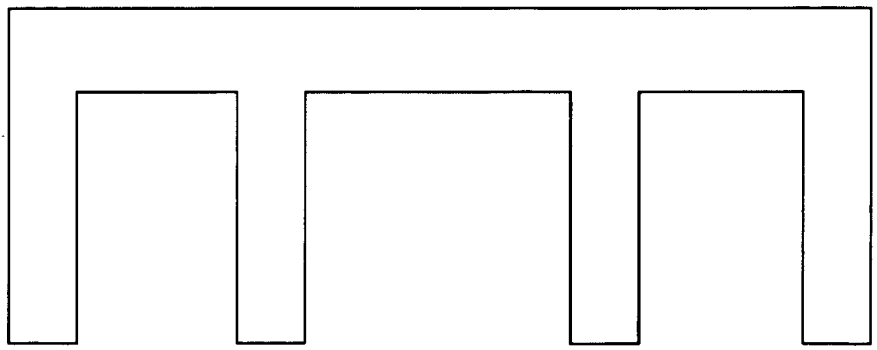
Figure 4G:
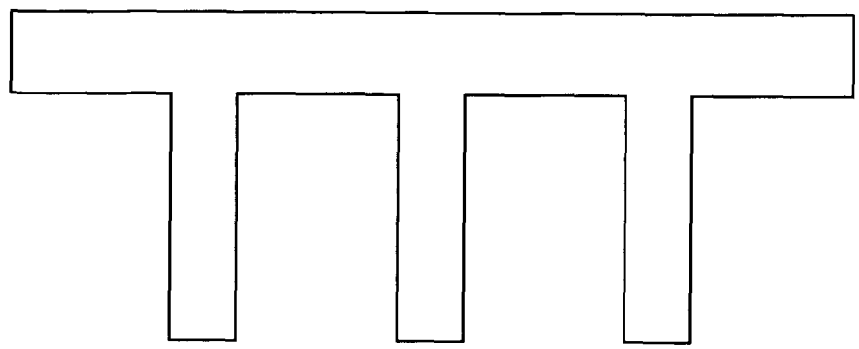
Figure 4H:
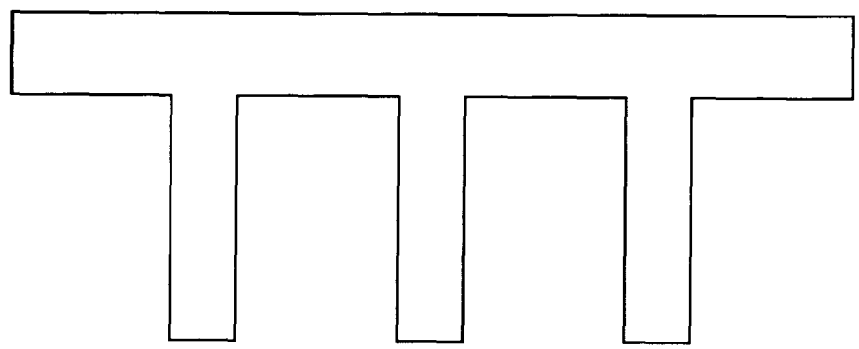
Figure 4I:
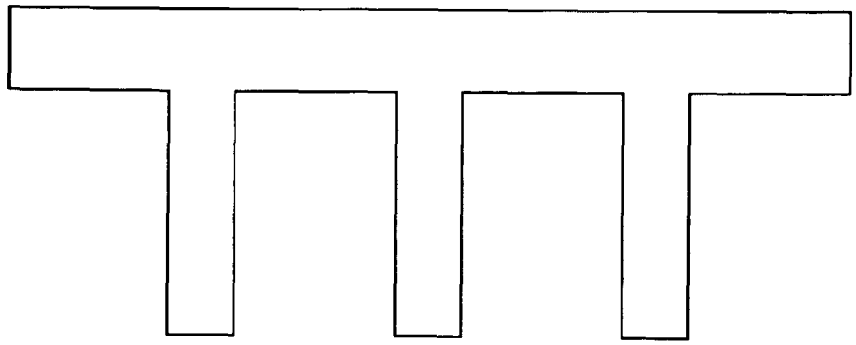

The second seal member 6 (or proximal seal member) is disposed at the annular end portion 12 of the case 2 for sealing against the distal end D of the pipe P. The second seal member 6 may be formed integrally with the annular portion 12 of the case 2 (as shown at 6a1 in FIG. 3A) or, preferably, may comprise an annular gasket 6a2 positioned at least partially in an annular groove 120 formed in the annular end portion 12 of the case 2 (as shown in FIG. 3B). The annular gasket 6a2 is preferably formed as a single annular ring with a dome-shaped cross section, as illustrated in FIG. 3B. However, the second seal member 6 may effectively be made in any other suitable configuration that effectively seals the pipe thread from contamination, such as, for example, a seal having a substantially circular, rectangular, or trapezoidal cross section. Furthermore, the second seal member 6 may be formed with a plurality of annular ridges protruding therefrom, to provide a plurality of sealing surfaces. In that case, each of the plurality of ridges may be constructed having any of the cross sections described above with respect to the first seal member 4.

At least one, but preferably both, of the first and second seal members 4, 6, is detachable from the case 2, and comprises a material different than a material of the case 2. Preferably both the first and second seal members 4, 6, comprise an elastomeric material, such as rubber, EPDM (Ethylene Propylene Diene Monomer), NBR or polyurethane. However, numerous other elastomeric materials may also be used, depending on the particular application.

Another preferred embodiment of our invention is shown in FIG. 5. The protector 1b of this embodiment is similar to the first, except that the second sealing member 6b has a trapezoidal cross section and is disposed on the surface of the annular end portion 12 of the case 2, rather than in a groove formed in the annular end portion as in the case of the previous embodiment.

Yet another preferred embodiment is shown in FIG. 6. In this embodiment, a protector 1c is shown installed on a pipe P end having a female connection. The protector 1c includes a case 2c having a cylindrical portion 8c and an annular end portion 12c. The surface of the cylindrical portion 8c includes threads 10c to engage the female threaded region T2 of the pipe P to hold the protector 1c in place on the end of the pipe P. In this embodiment, a first/proximal seal member 4c has a trapezoidal cross section and engages and seals against an inner, annular sealing surface 16 formed inside the interior of the pipe P. A second/distal seal member 6c also has a trapezoidal cross section and is disposed on the surface of the annular end portion 12c to engage and seal against the distal end D of the pipe P.

The annular end portion of the case may take the form of a solid disc (such as that shown in FIG. 5), such that flow through the pipe is effectively blocked. In this arrangement, once protectors are installed on both ends of a pipe, the interior of the pipe can be substantially sealed against passage of fluid. Alternatively, the annular end portion may be constructed as a ring having an opening in the center (such as that shown in FIG. 6), such that the threaded region T of the pipe P is protected, but the ends of the pipe P are otherwise unobstructed. This arrangement allows for the insertion of tools or other equipment within the pipes during installation and the like. This arrangement also allows water to escape from the pipe to thereby prevent corrosion of the interior of the pipe. In either of the foregoing arrangements, the annular end portion or, in the case of the male pipe thread protector the cylindrical portion, may be provided with two or more opposed flat surfaces for engagement by a wrench, if necessary or desired to allow for secure installation.

In one preferred aspect, a Vapor Corrosion Inhibitor (VCI) film can be applied to the surface of the protector case adjacent to the pipe to further enhance corrosion protection in the hermetically sealed area. Suitable VCI films include starch and polyethylene-based films and biodegradable films, and can be applied by any conventional application technique, such as, for example, spray coating, powder coating, application by brush or other implement, dipping, and the like.

Various embodiments of our invention are shown as applied to protectors for either male pipe connections (e.g., those illustrated in FIGS. 1 and 5) or female pipe connections (e.g., FIG. 6). It should be understood, however, that each of the disclosed embodiments could readily be modified to protect either male or female pipe connections by simply rearranging the locations, shapes, and orientations of the seal members relative to the case without departing from the spirit and scope of the invention.

During installation, the seal members slide past the threaded portion T of the pipe P. This sliding contact tends to abrade both the seal members and the dope-free coating deposited over the threaded region T. To minimize this abrasion, particularly when the first seal member is a cylindrical band as in FIGS. 1 and 5, the seal members should be flexible enough to slide past the threaded region T without scratching or otherwise damaging the depeless dope-free coating on the treaded region T of the pipe P. Making the seal members separate from the case allows the material and hardness of the seal members to be selected independently of the material constraints of the case. This allows the seal members to be replaced as they become worn or damaged, without having to replace the entire protector. This also allows the seal members to be made of softer materials, which can easily slide over the threaded region T of the pipe P without damage to the thread coating, and allows the protector to be slid over the pipe end without the need for tools. A still further advantage of using seal members made of different material than the case is that the protectors can exhibit the benefits of expensive sealing materials, without the high cost associated with a protector made entirely from the expensive sealing material. Thus, our invention provides superior sealing ability at a relatively low cost.

The embodiments discussed above are representative of preferred embodiments of my invention and are provided for illustrative purposes only. They are not intended to limit the scope of the invention. Although specific structures, dimensions, components, etc., have been shown and described, such are not limiting. Modifications and variations are contemplated within the scope of my invention, which is intended to be limited only by the scope of the accompanying claims.

What is claimed is:
1. A pipe thread protector comprising:
 a case attachable to an end of a pipe to protect a threaded region of the pipe, the case comprising a first rigid polymeric material with a first distal end adjacent to a cylindrical or frustoconical portion comprising threads over at least a portion of its length which are adapted to engage the threaded region of an attached pipe, and further comprising a second end comprising an annular end portion configured to abut a distal end of an attached pipe and limit the distance the case can be pressed on a pipe in the intended use;
 a first seal member comprising a first elastomeric material softer than the first rigid polymeric material that is both disposed so as to be detachable from a first annular recess which is proximate to the first distal end of the case and adjacent to the threads of the cylindrical or frustoconical portion of the case, wherein said first seal member comprises at least one sealing surface which extends outwardly from said first recess so as to sweep over threads of a pipe while the case is being pressed on a pipe in the intended use; and
 a second seal member comprising a second elastomeric material softer than the first rigid polymeric material that is both disposed so as to be detachable from a second annular recess which is proximate to the second, annular end portion of the case and comprises at least one sealing surface which extends outwardly from said second recess so as to abut the distal end of a pipe and thereby limit the distance the case can be pressed on a pipe that has been attached in the intended use.

2. A pipe thread protector as recited in claim 1, wherein the first and second seal members are configured to hermetically seal the threaded region of the pipe against contaminants when the pipe thread protector is installed on the end of the pipe.

3. A pipe thread protector as recited in claim 1, wherein the first and second elastomeric materials comprise a material selected from the group consisting of rubber, Ethylene Propylene Diene Monomer (EPDM), Nitrile Elastomers (NBR rubbers), and polyurethane.

4. A pipe thread protector as recited in claim 1, wherein the first seal member further comprises a substantially cylindrical band portion that is detachably and partially positioned in said first annular recess in the case, said first annular recess further comprising a radial groove that is formed in a cylindrical portion of the case comprising high density polyethylene, and the first seal member sealing surface comprises at least one rib that extends outwardly from the cylindrical band portion.

5. A pipe thread protector as recited in claim 4, wherein the first seal member sealing surface further comprises a plurality of ribs protruding outwardly from the cylindrical band in order to sweep over threads of a pipe while the case is being pressed on a pipe in the intended use.

6. A pipe thread protector as recited in claim 5, wherein each rib of the plurality of ribs has one of a substantially triangular cross section, a substantially trapezoidal cross section, a substantially dome-shaped cross section, a substantially circular cross section, and a substantially rectangular cross section.

7. A pipe thread protector as recited in claim 1, wherein the second seal member comprises an annular gasket positioned at least partially in said second annular recess so as to enable an axial sealing contact with the distal end of a pipe after the case has been attached in the intended use, and said second annular recess further comprises an annular groove formed in the annular end portion defining the second end of the case.

8. A pipe thread protector as recited in claim 7, wherein the annular gasket extends outwardly from the second recess with one of a substantially triangular cross section, a substantially trapezoidal cross section, a substantially dome-shaped cross section, a substantially circular cross section, and a substantially rectangular cross section.

9. A pipe thread protector as recited in claim 1, wherein the case is adapted so as to be attachable to an end of a pipe having a male threaded connection.

10. A pipe thread protector as recited in claim 1, wherein the case is adapted so as to be attachable to an end of a pipe having a female threaded connection.

11. A pipe thread protector as recited in claim 1, further comprising a vapor colTosion inhibitor film covering at least a portion of the surface of the case adjacent to the pipe.

12. A pipe thread protector comprising:
a case attachable to an end of a pipe to protect a threaded region of the pipe, the case comprising a first rigid polymeric material with a first distal end adjacent to a cylindrical or frustoconical portion comprising threads over at least a portion of its length which are adapted to engage the threaded region of an attached pipe, and further comprising a second end comprising an annular end portion configured to both sealingly abut a distal end of an attached pipe and limit the distance the case can be pressed on that pipe in the intended use; p1 a first seal member comprising a first elastomeric material softer than the first rigid polymeric material that is disposed so as to be detachable from a first annular recess which is proximate to the first distal end of the case, wherein said first seal member further comprises a first portion which engages said first annular recess and a second portion that extends outwardly from said first cylindrical band portion and is defined by at least one rib that is adapted to sweep over threads of a pipe while the case is being pressed on a pipe in the intended use; and a second seal member comprising a second elastomeric material softer than the first rigid polymeric material that is both disposed so as to be detachable from a second annular recess and is proximate to the second, annular end portion of the case, wherein said second seal member extends outwardly from said second recess so as to abut the distal end of a pipe after the case has been attached, so that the second seal makes an axial sealing contact with said distal end of the pipe after the case has been fully pressed on a pipe in the intended use.

13. A pipe thread protector as recited in claim 12, wherein the second portion of the first seal comprises more than one rib and each rib has one of a substantially triangular cross section, a substantially trapezoidal cross section, a substantially dome-shaped cross section, a substantially circular cross section, and a substantially rectangular cross section.

* * * * *